United States Patent
Tell

(10) Patent No.: US 8,550,790 B2
(45) Date of Patent: Oct. 8, 2013

(54) VACUUM GENERATOR, DRIVEN BY HIGH-PRESSURE AIR, AND HAVING MEANS ARRANGED THEREWITH FOR THE ACTIVE RELEASE OF AN OBJECT THAT IS GRIPPED IN A VACUUM-GRIPPER

(75) Inventor: Peter Tell, Akersberga (SE)

(73) Assignee: Xerex AB, Taby (SE)

( * ) Notice: Subject to any disclaimer, the term of this patent is extended or adjusted under 35 U.S.C. 154(b) by 552 days.

(21) Appl. No.: 12/812,610

(22) PCT Filed: Jan. 20, 2009

(86) PCT No.: PCT/SE2009/050053
§ 371 (c)(1),
(2), (4) Date: Jul. 13, 2010

(87) PCT Pub. No.: WO2009/120132
PCT Pub. Date: Oct. 1, 2009

(65) Prior Publication Data
US 2010/0290925 A1 Nov. 18, 2010

(30) Foreign Application Priority Data
Mar. 26, 2008 (SE) .................................. 0800672

(51) Int. Cl.
F04B 49/00 (2006.01)
F04F 5/48 (2006.01)
B25B 11/00 (2006.01)

(52) U.S. Cl.
USPC .............. 417/46; 417/187; 417/191; 269/21

(58) Field of Classification Search
USPC ..................... 417/46, 182, 187, 189; 269/21, 269/32
See application file for complete search history.

(56) References Cited

U.S. PATENT DOCUMENTS

| | | | |
|---|---|---|---|
| 4,600,230 A | 7/1986 | Ise | |
| 4,865,521 A | 9/1989 | Ise et al. | |
| 7,140,389 B2 * | 11/2006 | Schnatterer et al. | 137/565.23 |
| 2007/0280833 A1 * | 12/2007 | Miyake et al. | 417/12 |
| 2008/0099713 A1 * | 5/2008 | Fritts | 251/325 |

OTHER PUBLICATIONS

International Search Report, dated May 6, 2009, from corresponding PCT application.

* cited by examiner

*Primary Examiner* — Charles Freay
(74) *Attorney, Agent, or Firm* — Young & Thompson

(57) ABSTRACT

A vacuum generator driven by compressed air and arranged to supply vacuum to a vacuum gripper element, wherein a chamber (6) is associated with the vacuum generator and arranged to be brought in flow connection (9) with the vacuum gripper element via a valve (15) which is actuated by overpressure accumulated in the chamber to open the connection (9) to the vacuum gripper element in order to discharge the overpressure to the vacuum gripper element in result of interruption of the compressed air flow (P). The vacuum generator is characterized in that the chamber (6) in addition includes a flow connection (11) with the ambient atmosphere, and in the additional flow connection (11) a one-way valve (10) which is arranged to open the connection (11) with the atmosphere in result of the air pressure in the chamber (6) falling below the atmospheric pressure.

12 Claims, 2 Drawing Sheets

US 8,550,790 B2

VACUUM GENERATOR, DRIVEN BY HIGH-PRESSURE AIR, AND HAVING MEANS ARRANGED THEREWITH FOR THE ACTIVE RELEASE OF AN OBJECT THAT IS GRIPPED IN A VACUUM-GRIPPER

TECHNICAL FIELD OF THE INVENTION

This invention relates to vacuum generators driven by compressed air, and equipped with means by which a gripped object can be actively released from a vacuum gripper means that is supplied from the vacuum generator. More precisely, the invention refers to a vacuum generator which is driven by compressed air to generate vacuum to a vacuum gripper, wherein a chamber is associated with the vacuum generator and arranged to be brought in flow communication with the vacuum gripper via a valve that is operated by compressed air and which is arranged to open said flow communication to the vacuum gripper in order to discharge an over-pressure from the chamber upon closure of the supply of compressed air.

BACKGROUND AND PRIOR ART

It is known, in order to reduce cycle times in industrial production lines, to install vacuum systems having arrangements for the active release of objects from vacuum grippers that rely on sub-pressure or vacuum for gripping and moving the object. A solution that has often been put into practise is to allow compressed air into the vacuum gripper or into a line that supplies vacuum to the vacuum gripper, via a controlled valve, in order this way to interrupt the vacuum which holds the object to the vacuum gripper means. Another solution would be to connect the vacuum gripper or the supply line with atmospheric pressure, via a controlled valve.

Even if the firstly mentioned solution provides a fast release, this solution may however in some applications be too rough when fragile objects are concerned. In such applications the skilled person is limited to use the last mentioned solution, which however not always provides the desired fast response and may therefore hamper the rate of production.

SUMMARY OF THE INVENTION

The invention aims to avoid the above problem and to provide a vacuum generator which is arranged for a fast as well as mild release of an object that is gripped by a vacuum gripper means.

The invention also aims to provide a vacuum generator with unlimited and immediate supply of air for an active release of an object gripped by a vacuum gripper means.

Yet another object of the invention is to provide a vacuum generator comprising a release function which can be adapted to varying demands for air in order to interrupt the vacuum in a vacuum gripper means.

One or several of these objects are met in a vacuum generator as specified in claim 1. Advantageous embodiments of the vacuum generator are defined in the subordinated claims.

Briefly, herein is disclosed a vacuum generator of the type stated above and which is characterized by a chamber that comprises a flow communication with the ambient atmosphere, and in the flow communication a one-way valve which is arranged to open the connection with the atmosphere in response to an air pressure of the chamber falling below the ambient atmospheric pressure.

Through this solution there is accomplished an unlimited supply of air for filling out the vacuum produced for the vacuum gripper means. The accomplished technical effect is that an active release of a gripped object is always ensured, without the need to supply energy for valve control or for feeding compressed air to the vacuum gripper means.

In a specifically advantageous embodiment, the chamber comprises a connection for connecting the chamber to an external volume of overpressure air. The external volume of overpressure air preferably comprises an additional chamber which can be brought in flow communication with the compressed air supply via the first chamber in order to build up the volume of overpressure air, and which also via the first chamber can be brought in flow communication with the vacuum gripper means in order to discharge the volume of overpressure air.

This embodiment provides the technical effect of increased flexibility to adapt the subject vacuum generator to vacuum gripper means of different sizes and of corresponding different air consumption.

The chamber is formed with an intake that provides flow communication with the supply of compressed air that operates the vacuum generator, as well as a discharge which provides flow communication with the vacuum gripper means. It is preferred that a valve body is located between the intake and the discharge and arranged in a first valve position to open the intake and close the discharge when compressed air is applied to the valve body, while in a second valve position the valve body closes the intake and opens the discharge when the valve body is instead under load from the overpressure that is accumulated in the chamber.

This embodiment leads to a simple and carefree structure, especially when the valve body is formed as a piston that is movable in a cylinder-shaped seat, the piston having a suction side sealing against the chamber discharge in the first valve position, and a pressure side sealing against the cylindrical intake in the second valve position.

In the region of its suction side, the piston may be formed with a surrounding and flexible collar. The collar is dimensioned to be brought in sealing contact about the inner periphery of the seat in result of the overpressure that is built up in the chamber, in the second position of the valve i.e. upon evacuation of the chamber or chambers. On its outer side, the valve body comprises at least one axial passage for compressed air to pass said collar in to the chamber in the first position of the valve body i.e. during accumulation of overpressure in the chamber/chambers.

Through this embodiment there is provided a self-regulating valve that switches between the two directions of flow into and out from the chamber, without requiring energy to be supplied for the control of the valve.

Preferably, the one-way valve in the flow communication with the atmosphere is formed as a flap valve, suitably made of flexible material.

At least the chamber that houses the valve function may be integrated in the vacuum generator. Said chamber, and also the additional chamber if appropriate, can be arranged in flow communication with the vacuum gripper means via the suction line through which the vacuum gripper means is supplied vacuum from the vacuum generator.

SHORT DESCRIPTION OF THE DRAWINGS

The invention is explained more in detail below with reference made to the accompanying drawings, wherein an embodiment of the invention is illustrated schematically:

Figure 2:
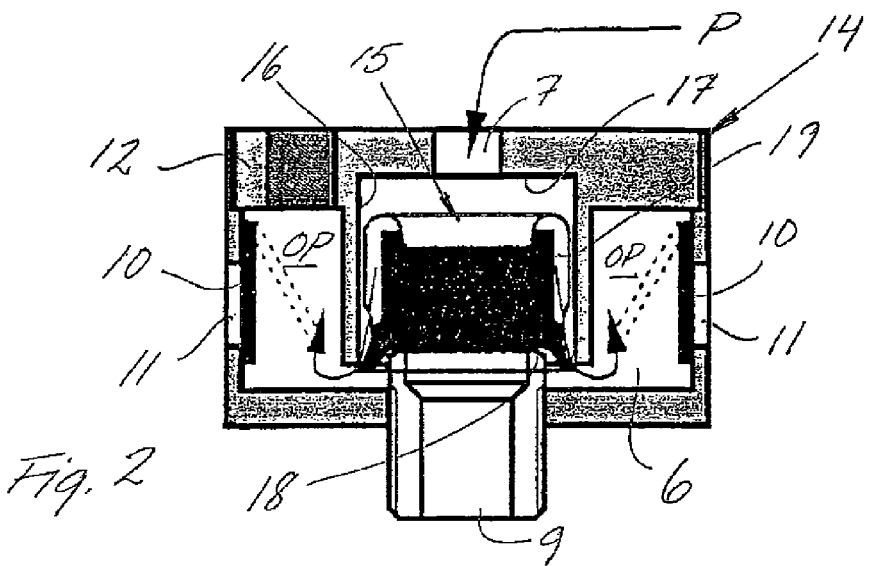
FIG. 2 is a cross sectional view through a valve arrangement associated with or comprised in a vacuum generator driven by compressed air, wherein a valve body is placed in a first valve position for accumulation of an overpressure in a chamber included in the valve arrangement.
Figure 3:
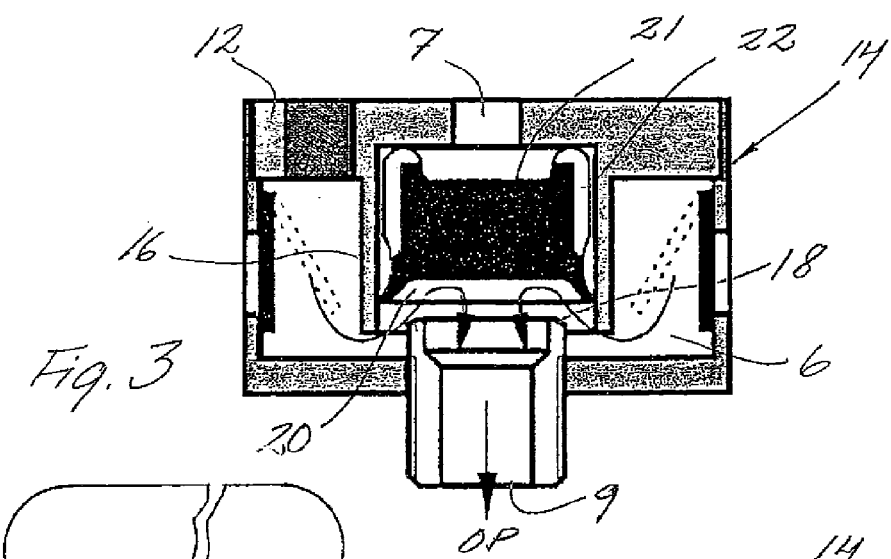
Figure 4:
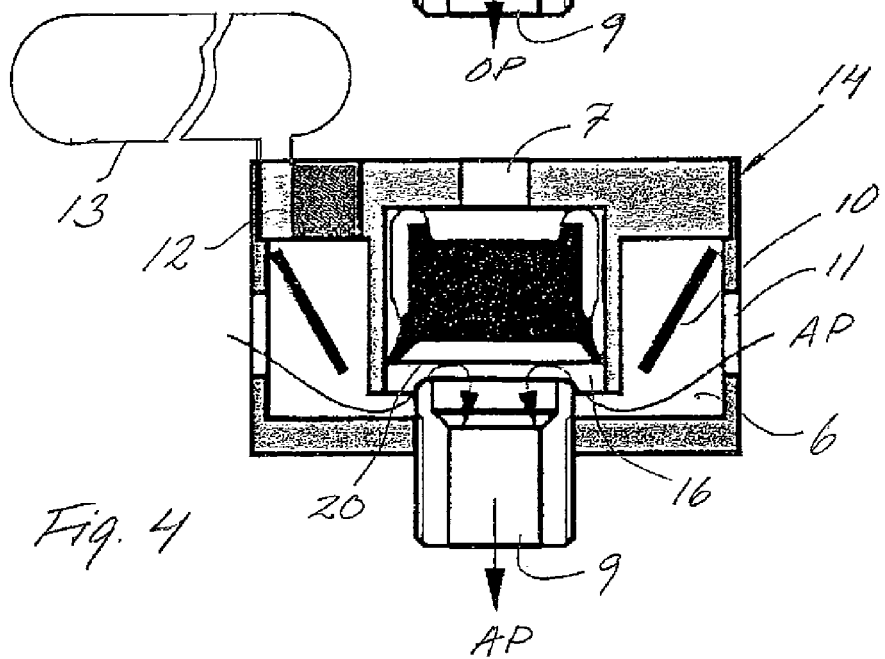

FIG. 3 is a cross sectional view corresponding to FIG. 2, wherein the valve body is located in a second valve position for evacuation of the overpressure that is accumulated in the chamber, and FIG. 4 is a cross sectional view corresponding to FIG. 3 showing the valve body in the second position and in a sequence wherein the accumulated overpressure is completely evacuated and the chamber is connected to the ambient atmosphere.

DETAILED DESCRIPTION OF THE INVENTION

Figure 1:
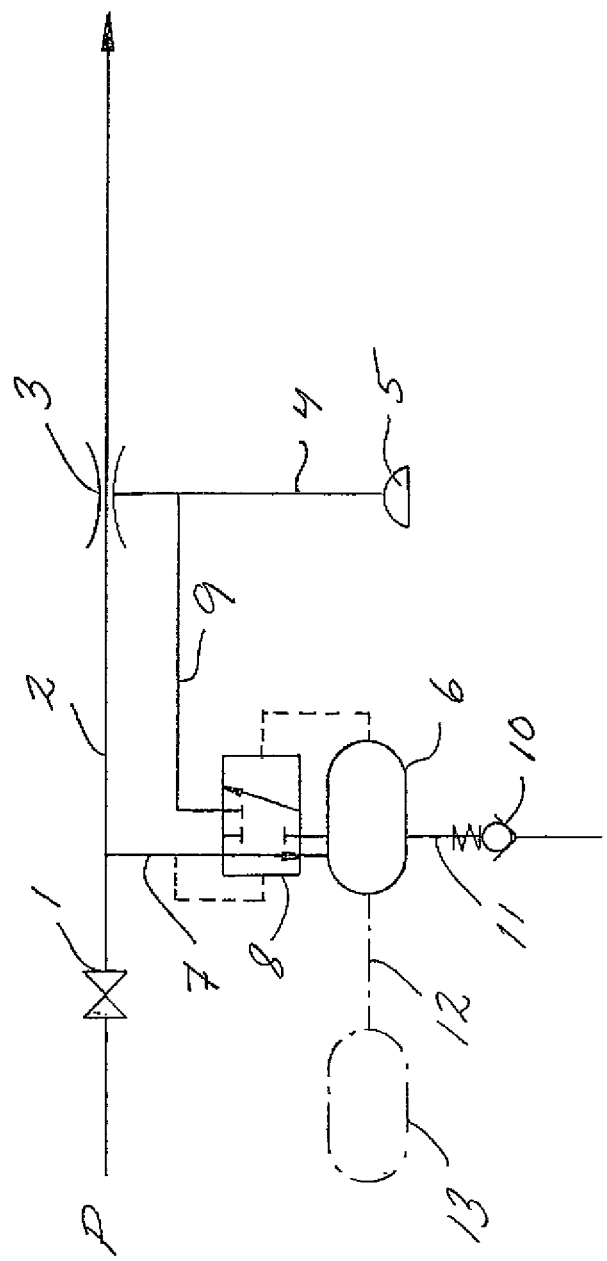
FIG. 1 is a symbolic pneumatic circuit illustrating the invention as implemented in a vacuum system.

For a general description of implementation of the invention in a vacuum system, reference is initially made to FIG. 1. In FIG. 1, the line P represents the direction of compressed air flow from a compressed air supply source via a valve 1 and a compressed air line 2 to a vacuum generator 3. The vacuum generator 3 supplies vacuum to a vacuum gripper means 5, via a suction line 4. The valve 1 can be switched between open and closed positions, and may also be adjustable for a proportional control of the compressed air volume, and may further be associated with control means and pressure sensors as is known per se.

The vacuum generator 3, in FIG. 1 schematically illustrated as a restriction, is typically realized as an ejector. The vacuum gripper means 5 may be realized as a suction cup, or as a set of suction cups that are commonly supplied from the vacuum generator 3.

In view of a fast release of an object from the vacuum gripper means 5, the system is associated with an arrangement which actively interrupts the vacuum in the vacuum gripper means upon closure of the valve 1. The arrangement comprises a chamber 6 which can be connected for flow communication, via a line 7 and a valve 8, with the compressed air P in the line 2. The valve 8 is arranged as a by-pass valve which opens for air flow into the chamber when compressed air is supplied to the vacuum generator. An overpressure is thus accumulated in the chamber 6, in the open position of the valve 8. The valve 8 is however designed as a two-way valve which is actuated by the over-pressure that is accumulated in the chamber 6. Upon closure of the compressed air P, upon which atmospheric pressure is established in the lines 2 and 7, the valve 8 is thus switched in result of which the chamber 6 is brought in flow communication with the vacuum gripper means 5, via a line 9, for discharge of the over-pressure previously built up in the chamber 6. Even if the line 9 in the circuit of FIG. 1 is shown to mouth in the suction line 4 it will be realized that this line can alternatively be arranged to mouth directly in the vacuum gripper means 5.

It will be realized that the air volume which is available for release is limited to the volume of the chamber 6. The air volume which is required to ensure release of an object is however depending on the collective volume of the vacuum gripper means and its associated lines and channels, in which the pressure is the same as in the vacuum gripper. In order to ensure unlimited supply of air it is suggested by this invention that the chamber 6 is connectable to ambient atmosphere AP via a one-way valve 10, which is arranged in a flow connection 11. The valve 10 opens for air flow to the chamber 6 when the atmospheric pressure is above the pressure prevailing in the system including the chamber 6, the vacuum gripper means 5 as well as lines and channels that connect these pneumatically.

In addition, the chamber 6 preferably has a connection 12 for connecting to an additional overpressure volume 13. The additional overpressure volume 13 may be realized as an external chamber 13 which is optionally connectable to the chamber 6 if required. The external chamber 13 is in direct flow communication with the chamber 6 via the connection 12.

It shall be noted that FIG. 1 merely depicts the general layout of a vacuum system for the purpose of illustrating the invention, and that a vacuum system in practise can comprise additional valves, sensors and flow connections in order to adapt the vacuum system to a desired functionality, as would be known to a person skilled in the art. In this connection it shall also be mentioned that the inventive arrangement for an active release of a gripped object can alternatively be arranged separate from the compressed air supply to the vacuum generator.

An embodiment of the arrangement will now be described with reference to FIGS. 2-4, wherein details of the embodiment that correspond to the above description of the pneumatic circuit will be indicated by the corresponding reference numbers that were previously used in FIG. 1.

In FIG. 2, the arrangement is shown in a mode wherein overpressure OP is accumulating in the chamber 6. The chamber 6 is located in a house 14 having an intake 7 and a discharge 9. A self-adjusting valve body 15 is arranged between the intake 7 and the discharge 9. The valve body 15 is movably arranged in a seat 16 that is formed in the house, in one end of which the intake 7 mouths inside of a support surface 17 for the corresponding end of the valve body 15. The other end of the seat opens towards the discharge 9, which projects tube-shaped into the chamber 6 with a mouth surrounded by a support surface 18 for the opposite, other end of the valve body 15. A gap for air flow in the direction of the arrows in FIGS. 2-4 is formed between the open end of the seat 16 and the bottom of the chamber. The seat 16 and the discharge 9 are preferably cylindrical in shape and in coaxial alignment with the intake 7. The valve body 15 is preferably shaped as a piston having a cylindrical cross section. Also the house 14 may be shaped as a cylinder in coaxial alignment with the intake 7, the seat 16, the valve body 15 and the discharge 9.

In the position shown in FIG. 2, the valve body 15 is under load from the compressed air P applied to that end of the valve body 15 which can be seen as the pressure side thereof. The opposite side of the valve body 15 is brought in sealing contact against the support surface 18 surrounding the discharge 9, the discharge being in flow connection with the vacuum gripper means 5. Sub-pressure thus prevails at the discharge 9, whereby the subject end of the valve body 15 can be seen as the suction side thereof. In this position of the valve body 15 compressed air can pass on the outside of the valve body to raise the pressure in the chamber 6, which in this embodiment surrounds the seat 16 in the shape of a ring. To this purpose, at least one axial passage 19 is formed on the outside of the valve body. Preferably though, several passages 19 are equidistantly arranged about the periphery of the valve body, and separated through axial ridges on the outside of the valve body by which the valve body is prevented from wedging during its movement in the seat 16.

With reference to FIG. 3, the arrangement is shown in a position wherein the compressed air P is interrupted, and the overpressure that is built up in the chamber 6 is evacuated via the discharge 9. At the same moment in which the pressure side of the valve body is no longer under load from the flow of compressed air P, the overpressure accumulated in the chamber 6 will cause the valve body 15 to be displaced into contact with the support surface 17 which surrounds the mouth of the intake 7. Any leakage between the valve body and the wall of the seat is efficiently prevented by a skirt or collar 20 supported externally on the valve body and running about the periphery of the valve body so as to seal against the inner side of the seat 16. The collar 20 is elastic in radial direction, and the collar may constitute a circular wall running about a cup-shaped suction side of the valve body 15. As illustrated through this embodiment, the wall thickness of said collar is preferably tapering towards the outer edge of the collar so as to provide enhanced flexibility. By way of its flexibility, the collar is resilient in radial direction for passage of the compressed air which enters through the intake 7, while upon evacuation of the chamber 6 the collar 20 is effective to prevent leakage via the intake 7. Advantageously, the collar 20 is arranged as a member that is integrally formed in a core 21 of elastic material which is inserted in a protecting jacket 22 made of harder material, such as a hard synthetic material or a metal. In both cases it will be accomplished that the valve body 15, upon building up the overpressure in the chamber 6, is biased towards its position in evacuation according to FIG. 3, in result of the inherent elasticity of the valve body or of its core portion.

In result of the displacement of the valve body towards the intake 7, the chamber 6 is opened for evacuation of the overpressure via the discharge 9. It will be appreciated that the seat and the valve body preferably are so dimensioned that the valve body needs only a short stroke length, this way consuming as small portion as possible of the overpressure that is accumulated in the chamber 6.

With reference to FIG. 4 the arrangement is shown in a mode wherein the overpressure is evacuated from the chamber 6, and a pressure below the atmospheric pressure still prevails in the system downstream of the chamber 6. Upon this relation between the pressures, the one-way valve 10 opens to admit atmospheric pressure AP to enter into the chamber 6 via the opening 11. The one-way valve 10 may be arranged as in the illustrated embodiment to include a valve flap which is pivotally journalled on the inner side of the chamber wall, near the opening 11. Alternatively, the one-way valve 10 can be realized as a flexible valve flap which folds or flexes away in result of the difference in pressure between the chamber and the ambient atmosphere. In this way it is accomplished that an unlimited amount of air is provided for interruption of the vacuum in the vacuum gripper means 5.

A flow line 12 leads from the chamber 6 for connection to an external chamber 13, which is in direct flow communication with the chamber 6 via the flow line 12. The external chamber 13 follows slavishly on the chamber 6 during accumulation and during evacuation of overpressure from the chambers 6 and 13. The available overpressure volume is this way readily adaptable to different needs through the connection to an external chamber 13 of adequate volume.

For purpose of dimensioning the overpressure volume it is alternatively considered that the house 14 is arranged for adjustment of the volume in the chamber 6, such as through a movable wall located in the house, or through a dead volume which can be inserted in the chamber 6.

The arrangement comprising the house 14 with the chamber 6 and associated valve elements may constitute a separate assembly which is connectable to the vacuum generator, or may alternatively be integrated in the structure of the vacuum generator.

The presented solution for an active release of a gripped object is characterized through a forced initial raise in pressure in combination with a successive self-generated equalization to atmospheric pressure in the vacuum gripper means. It is this way accomplished that the release sequence can be reduced in time, also in connection with fragile objects which require a gentle release from the vacuum gripper means.

Furthermore, the presented solution is most energy efficient since no compressor power is needed and no driving compressed air is consumed during the release sequence.

The invention is defined in the accompanying claims, encompassing the above and other modifications of the invention which may be appreciated by the skilled person from the teachings provided above.

The invention claimed is:

1. A vacuum generator driven by compressed air and arranged to supply vacuum to a vacuum means for gripping, wherein a chamber (6) is associated with the vacuum generator and arranged to be brought in flow connection (9) with the vacuum means for gripping via a valve (15) which is actuated by overpressure accumulated in the chamber to open said connection (9) to the vacuum means for gripping in order to discharge the overpressure to the vacuum means for gripping in result of interruption of the compressed air flow (P), wherein said chamber (6) in addition comprises an additional flow connection (11) with the ambient atmosphere, and in the additional flow connection (11) a one-way valve (10) which is arranged to open the connection (11) with the atmosphere in result of the air pressure in the chamber (6) falling below the atmospheric pressure.

2. The compressed air driven vacuum generator of claim 1, wherein the chamber (6) has a connection (12) for connecting the chamber to an external overpressure volume (13).

3. The compressed air driven vacuum generator of claim 2, wherein the external overpressure volume comprises an additional chamber (13) which is brought in flow connection with the compressed air flow (P) via the chamber (6) in a first position of the valve (15), and which in a second position of the valve (15) is brought in flow connection with the vacuum means for gripping, via the chamber (6).

4. The compressed air driven vacuum generator according to claim 1, wherein the chamber (6) has an intake (7) in flow connection with the compressed air flow (P), as well as a discharge (9) in flow connection with the vacuum means for gripping, the valve (15) being located between the intake (7) and the discharge (9) and arranged in a first valve position to open the intake and to close the discharge when compressed air (P) is applied to the valve (15), while in a second valve position the valve is arranged to close the intake and open the discharge when the valve is under load from overpressure that is accumulated in the chamber (6).

5. The compressed air driven vacuum generator of claim 4, wherein the valve (15) comprises a valve body (15) movable in a seat (16), the valve body having a suction side sealing against the chamber discharge (9) in the first position of the valve, as well as a pressure side sealing against the chamber intake (7) in the second position of the valve.

6. The compressed air driven vacuum generator of claim 5, wherein the valve body (15) in the region of its suction side carries a flexible collar (20) running about the valve body, the collar being dimensioned to seal against the inner side of the seat (16) in result of the overpressure that is accumulated in the chamber, in the second position of the valve.

7. The compressed air driven vacuum generator according to claim 5, wherein the valve body (15) on its outer side comprises at least one axial passage (19) for compressed air flow (P) into the chamber (6), in the first position of the valve body (15).

8. The compressed air driven vacuum generator according to claim 1, wherein the one-way valve (10) is a flap valve.

9. The compressed air driven vacuum generator according to claim 1, wherein the chamber (6) is integrated in the vacuum generator.

10. The compressed air driven vacuum generator according to claim 1, wherein the chamber (6) is in flow connection with the vacuum means for gripping via a suction line (4) through which the vacuum means for gripping is supplied vacuum from the vacuum generator.

11. The compressed air driven vacuum generator according to claim 6, wherein the valve body (15) on its outer side comprises at least one axial passage (19) for compressed air flow (P) into the chamber (6), in the first position of the valve body (15).

12. A vacuum generation device comprising:
   a vacuum generator (3) constructed and arranged to be driven by compressed air flow (P);
   a vacuum means for gripping (5) constructed and arranged to receive vacuum from the vacuum generator (3);
   a chamber (6) disposed in airflow communication with the vacuum means for gripping (5) via a first flow connection (9);
   a valve (15) constructed and arranged to control the airflow communication between the chamber (6) and the vacuum means for gripping (5) by actuating open by accumulated overpressure in the chamber (6) when the compressed airflow (P) is interrupted, the valve (15), when actuated open, discharges the accumulated overpressure to the vacuum means for gripping; and
   a second flow connection (11) disposed between the chamber (6) and external atmosphere, the second flow connection (11) being controlled by a one way valve (11), the one way valve being constructed and arranged to open when pressure in the chamber (6) is below atmospheric pressure.

* * * * *